US010832099B2

(12) United States Patent
Watanabe et al.

(10) Patent No.: US 10,832,099 B2
(45) Date of Patent: Nov. 10, 2020

(54) DISPLAYING GUIDE IMAGES ON A TABLE

(71) Applicant: Sony Corporation, Tokyo (JP)

(72) Inventors: Kazuhiro Watanabe, Tokyo (JP);
Yoichiro Sako, Tokyo (JP); Akira
Tange, Tokyo (JP); Kazuyuki Sakoda,
Tokyo (JP); Kohei Asada, Kanagawa
(JP); Takatoshi Nakamura, Kanagawa
(JP); Mitsuru Takehara, Tokyo (JP);
Yasunori Kamada, Kanagawa (JP);
Takayasu Kon, Tokyo (JP); Kazunori
Hayashi, Tokyo (JP); Hiroyuki
Hanaya, Kanagawa (JP); Yuki Koga,
Tokyo (JP); Tomoya Onuma, Shizuoka
(JP)

(73) Assignee: Sony Corporation (JP)

(*) Notice: Subject to any disclaimer, the term of this patent is extended or adjusted under 35 U.S.C. 154(b) by 0 days.

(21) Appl. No.: 16/538,267

(22) Filed: Aug. 12, 2019

(65) Prior Publication Data

US 2020/0005099 A1    Jan. 2, 2020

Related U.S. Application Data

(60) Division of application No. 16/239,033, filed on Jan. 3, 2019, now abandoned, which is a continuation of
(Continued)

(30) Foreign Application Priority Data

Dec. 21, 2012    (JP) ................................ 2012-279520

(51) Int. Cl.
G06K 9/66    (2006.01)
G06K 9/00    (2006.01)
(Continued)

(52) U.S. Cl.
CPC ............. *G06K 9/66* (2013.01); *G06F 3/0304* (2013.01); *G06F 3/044* (2013.01);
(Continued)

(58) Field of Classification Search
None
See application file for complete search history.

(56) References Cited

U.S. PATENT DOCUMENTS 3,750,309 A * 8/1973 Tovar .................... B42D 1/001
434/382
4,830,619 A * 5/1989 Marion .................... G09B 1/34
281/15.1
(Continued)

FOREIGN PATENT DOCUMENTS

JP    2000149150 A    5/2000
JP    2004110377 A    4/2004
(Continued)

OTHER PUBLICATIONS

Associate Handbook—Fine Dining Standards (2010) http://media.frontsummit.com/Materials/SAMPLE_Fine_Dining_Handbook.pdf.*

*Primary Examiner* — Jason A Pringle-Parker
(74) *Attorney, Agent, or Firm* — Lerner, David, Littenberg, Krumholz & Mentlik, LLP

(57) ABSTRACT

There is provided a display control system including a plurality of display units, an imaging unit configured to capture a subject, a predictor configured to predict an action of the subject according to a captured image captured by the imaging unit, a guide image generator configured to generate a guide image that guides the subject according to a prediction result from the predictor, and a display controller configured to, on the basis of the prediction result from the predictor, select a display unit capable of displaying an image at a position corresponding to the subject from the
(Continued)

plurality of display units, and to control the selected display unit to display the guide image at the position corresponding to the subject.

17 Claims, 14 Drawing Sheets

Related U.S. Application Data application No. 15/235,406, filed on Aug. 12, 2016, now Pat. No. 10,204,293, which is a continuation of application No. 14/103,032, filed on Dec. 11, 2013, now Pat. No. 9,465,984.

(51) Int. Cl.
| | |
|---|---|
| *G06F 3/03* | (2006.01) |
| *G06F 3/044* | (2006.01) |
| *G06T 7/20* | (2017.01) |
| *G06T 7/60* | (2017.01) |
| *H04N 9/31* | (2006.01) |

(52) U.S. Cl.
CPC ..... *G06K 9/00228* (2013.01); *G06K 9/00348* (2013.01); *G06K 9/00389* (2013.01); *G06T 7/20* (2013.01); *G06T 7/60* (2013.01); *H04N 9/3185* (2013.01)

(56) References Cited

U.S. PATENT DOCUMENTS

| | | | |
|---|---|---|---|
| 6,129,550 A * | 10/2000 | Culberson | G09B 21/00 283/115 |
| 6,418,372 B1 | 7/2002 | Hofmann | |
| 6,924,741 B2 | 8/2005 | Tamayama et al. | |
| 7,035,650 B1 | 4/2006 | Moskowitz et al. | |
| 7,271,739 B2 | 9/2007 | Higelin | |
| 7,375,634 B2 | 5/2008 | Sprague | |
| 7,522,997 B2 | 4/2009 | Asahara et al. | |
| 7,738,883 B2 | 6/2010 | Hull | |
| 8,334,767 B2 | 12/2012 | Jain et al. | |
| 8,423,431 B1 | 4/2013 | Rouaix et al. | |
| 8,560,091 B2 | 10/2013 | Reumerman et al. | |
| 8,688,290 B2 | 4/2014 | Jotanotivc | |
| 8,892,350 B2 | 11/2014 | Weir et al. | |
| 8,930,129 B2 | 1/2015 | Chen | |
| 9,406,170 B1 * | 8/2016 | Grampurohit | G06T 3/005 |
| 9,749,823 B2 | 8/2017 | Rowe et al. | |
| 2004/0051644 A1 | 3/2004 | Tamayama et al. | |
| 2006/0267795 A1 | 11/2006 | Draaijer et al. | |
| 2007/0030152 A1 | 2/2007 | Sprague | |
| 2008/0007400 A1 | 1/2008 | Murphy | |
| 2009/0319176 A1 | 12/2009 | Kudoh et al. | |
| 2010/0153003 A1 | 6/2010 | Merkel et al. | |
| 2014/0349257 A1 * | 11/2014 | Connor | G09B 19/0092 434/127 |
| 2017/0031530 A1 * | 2/2017 | Ikeda | G03B 17/54 |

FOREIGN PATENT DOCUMENTS

| | | |
|---|---|---|
| JP | 2010231470 A | 10/2010 |
| JP | 2012118121 A | 6/2012 |
| JP | 2012519922 A | 8/2012 |
| JP | 2012226695 A | 11/2012 |

* cited by examiner

DISPLAYING GUIDE IMAGES ON A TABLE

CROSS REFERENCE TO RELATED APPLICATIONS

The present application is a divisional application of U.S. patent application Ser. No. 16/239,033, filed on Jan. 3, 2019, which is a continuation of U.S. patent application Ser. No. 15/235,406, filed on Aug. 12, 2016, now issued as U.S. Pat. No. 10,204,293, issued on Feb. 12, 2019, which is a continuation of U.S. patent application Ser. No. 14/103,032, filed on Dec. 11, 2013, now issued as U.S. Pat. No. 9,465,984, issued on Oct. 11, 2016, which claims the benefit of Japanese Priority Patent Application No. 2012-279520, filed on Dec. 21, 2012, the disclosures of which are hereby incorporated herein by reference.

BACKGROUND

The present disclosure relates to a display control system and a recording medium.

Within facilities such as amusement centers, train stations, hospitals, and municipal offices, map boards, guidance displays that indicate the route to a goal, and the like are provided throughout. However, with facilities of larger scale, the guide display becomes complicated, and may inconvenience users, such as by imposing the burden of checking one's current location or route many times until one reaches a goal. For this reason, technology that provides a suitable, personalized guide display to individuals is being developed.

For example, Japanese Unexamined Patent Application Publication No. 2004-110377 discloses technology in an airport facility that specifies a customer by an identification tag possessed by the customer, and provides a guide display based on pre-acquired customer information or information related to a departing flight near that specified customer's position.

Also, Japanese Unexamined Patent Application Publication No. 2000-149150 discloses technology in a hospital that specifies a patient by an identification card possessed by the patient, a voiceprint, a fingerprint, the iris, or the like, and provides the specified patient with a guidance display to a destination input in advance by reception staff or a doctor in the examining room.

SUMMARY

However, the above technologies disclosed in Japanese Unexamined Patent Application Publication No. 2004-110377 and Japanese Unexamined Patent Application Publication No. 2000-149150 both provide a guide/guidance display to a subject on the basis of information that has been input and stored in advance, and do not provide an interactive display depending on the subject's current state.

Accordingly, the present disclosure proposes a new and improved display control system and recording medium able to predict a subject's actions, and provide a guide display according to the prediction result.

According to an embodiment of the present disclosure, there is provided a display control system including a plurality of display units, an imaging unit configured to capture a subject, a predictor configured to predict an action of the subject according to a captured image captured by the imaging unit, a guide image generator configured to generate a guide image that guides the subject according to a prediction result from the predictor, and a display controller configured to, on the basis of the prediction result from the predictor, select a display unit capable of displaying an image at a position corresponding to the subject from the plurality of display units, and to control the selected display unit to display the guide image at the position corresponding to the subject.

According to an embodiment of the present disclosure, there is provided a non-transitory computer-readable recording medium having a program recorded thereon, the program causing a computer to execute capturing a subject, predicting an action of the subject according to a captured image, selecting, from a plurality of display units on the basis of a prediction result, a display unit capable of displaying an image at a position corresponding to the subject, generating a guide image that guides the subject according to the prediction result, and controlling the selected display unit to display the guide image at the position corresponding to the subject.

According to an embodiment of the present disclosure as described above, it is possible to predict a subject's actions, and provide a guide display according to the prediction result.

DETAILED DESCRIPTION OF THE EMBODIMENT(S)

Figure 1:
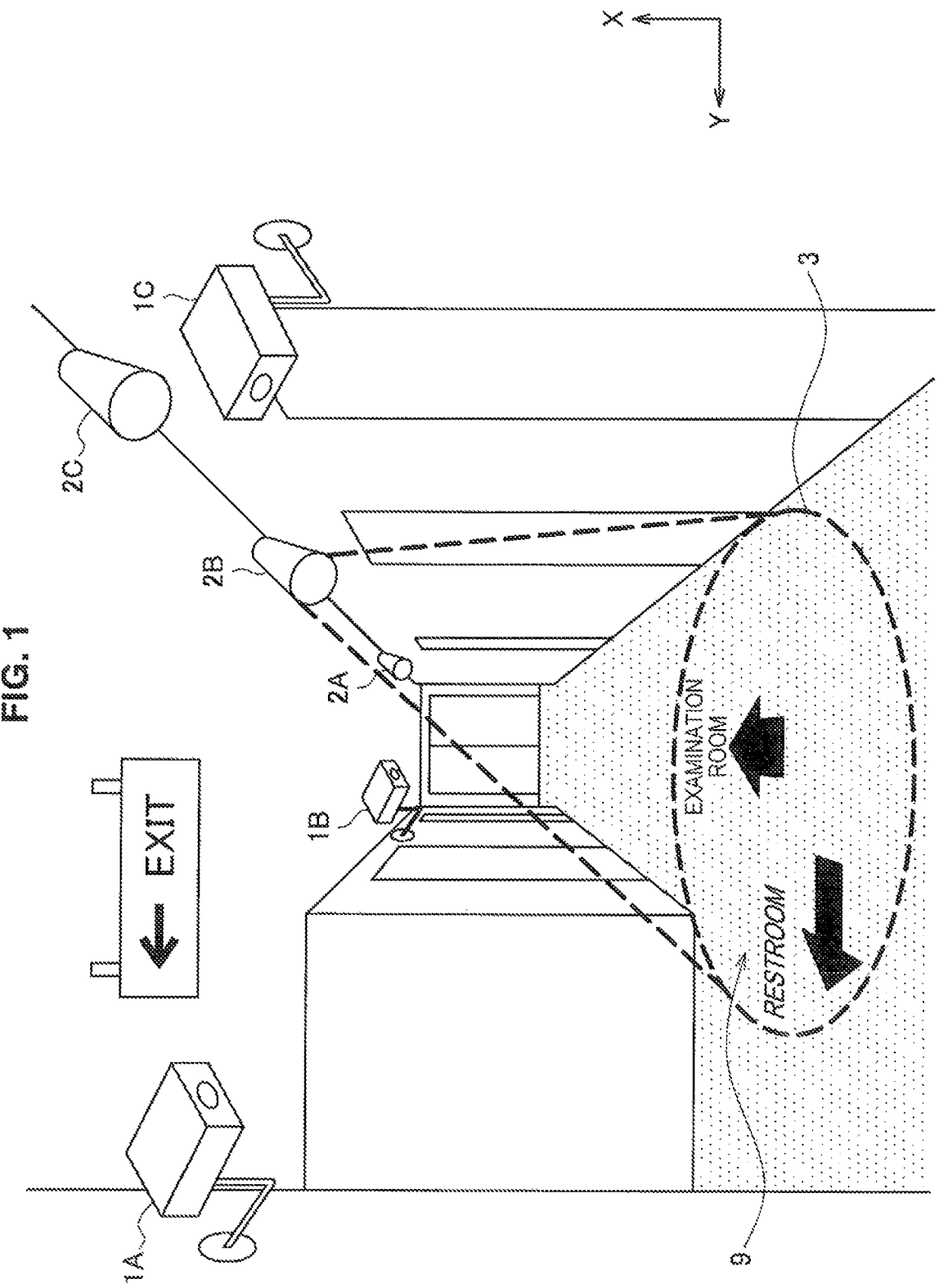
FIG. 1 is an explanatory diagram illustrating an overview of a display control system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, the description will proceed in the following order.

1. Overview of display control system
2. Embodiments
    2-1. First embodiment
        2-1-1. Configuration
        2-1-2. Operational process
        2-1-3. Modification 1
        2-1-4. Modification 2
        2-1-5. Modification 3
    2-2. Second embodiment
        2-2-1. Operational process
        2-2-2. Applied Example 1
        2-2-3. Applied Example 2
        2-2-4. Other applied examples
3. Conclusion

1. Overview of Display Control System

The present disclosure may be carried out in various embodiments, examples of which are described in detail from sections (2-1. First embodiment) to (2-2. Second embodiment). Also, a display control system according to each embodiment is equipped with:

A. multiple display units (display devices 2);

B. an imaging unit (camera 1) that captures a subject;

C. a predictor (predictor 42) that predicts an action of the subject according to a captured image captured by the imaging unit;

D. a guide image generator (guide image generator 43) that generates a guide image that guides the subject according to a prediction result from the predictor; and E. a display controller (display controller 44) that, on the basis of a prediction result from the predictor, selects a display unit able to display an image at a position corresponding to the subject from among the multiple display units, and controls the selected display unit to display the guide image at a position corresponding to the subject.

As described below, a display control system according to an embodiment of the present disclosure predicts a future action on the basis of a subject's current state, and displays a guide image generated according to the prediction result on a display unit selected from among multiple display units according to the prediction result.

Specifically, first, a predictor predicts a subject's future action according to a captured image captured by an imaging unit. For example, the predictor predicts a future action by estimating factors such as a subject's goal, something the subject is searching for, or the fact that an activity was aborted partway through, according to a captured image capturing factors such as the direction in which the subject is facing, a path selection at a corner or turn, a walking speed, a gesture, or line of sight movement.

Next, the guide image generator generates a guide image that guides the subject according to the prediction result from the predictor. For example, the guide image generator generates a guide image indicating a route to a goal, the position of something the subject is searching for, information reminding the subject of the aborted activity, or the like. In this way, a display control system according to an embodiment of the present disclosure is able to generate an interactive guide image depending on the subject's current state.

Subsequently, the display controller selects a display unit able to display an image at a position corresponding to the subject from among the multiple display units on the basis of the prediction result from the predictor, and controls the selected display unit to display a guide image at the position corresponding to the subject. For example, the display controller selects a display unit which is placed in the direction in which the subject is facing and which is capable of displaying an image near the subject's position, and controls the selected display unit to display a guide image at a position depending on the orientation of the subject's face or the height of the subject's point of view. In this way, a display control system according to an embodiment of the present disclosure is able to display a guide image at a suitable position depending on the subject's current state, or in other words, at a position easily visible to the subject.

Note that the above display unit and imaging unit may be installed indoors, such as in a room, house, or building, and also may be installed outdoors, such as by a street, on the wall of a building, or on a streetlight.

Guide image display operations by a display control system according to an embodiment of the present disclosure as described above will now be specifically described with reference to FIG. 1. As an example, FIG. 1 illustrates an example of applying a display control system according to an embodiment of the present disclosure to a hospital.

FIG. 1 is an explanatory diagram illustrating an overview of a display control system according to an embodiment of the present disclosure. As illustrated in FIG. 1, cameras 1A, 1B, and 1C as well as display devices 2A, 2B, and 2C are installed along a corridor inside a hospital. Note that hereinafter, the cameras 1A, 1B, and 1C will be collectively designated the cameras 1 when not being particularly distinguished. Similarly, the display devices 2A, 2B, and 2C will be collectively designated the display devices 2 when not being particularly distinguished. Also, as illustrated in FIG. 1, the display devices 2 are realized by projectors, for example.

Also, the cameras 1 and the display devices 2 are connected to a server (not illustrated) via a network, with the server including the predictor, guide image generator, and display controller described above. Alternatively, the predictor, guide image generator, and display controller described above may also be included in at least one of the cameras 1 and the display devices 2.

Herein, in the corridor illustrated in FIG. 1, the camera 1A captures a subject walking in the X direction. Subsequently, in the case where the subject continues walking and approaches an intersection, the predictor predicts, on the basis of the captured image, that the subject will take an action of either advancing straight in the X direction, or turning to the Y direction. Next, on the basis of a prediction result indicating that the subject will continue walking, the display controller selects, from among the multiple display devices 2A to 2C, the display device 2B capable of displaying an image on a display surface 3 which is in the advancing direction of the subject and which is at a distance visible to the subject. Also, according to the prediction result indicating that the subject may take an action of either advancing straight in the X direction or turning to the Y direction, the guide image generator generates a guide image that includes a display of an arrow in the X direction and an examining room positioned in the X direction, as well as a display of an arrow in the Y direction and a restroom positioned in the Y direction. Then, as illustrated in FIG. 1, the display controller controls the display device 2B to display a guide image 9 on the display surface 3 at the intersection, which is taken to be a position easily visible to the subject.

In this way, a display control system according to an embodiment of the present disclosure is able to predict a subject's actions, and provide a guide display according to the prediction result.

The above thus summarizes a display control system according to an embodiment of the present disclosure. Next, a display control system according to an embodiment of the present disclosure will be specifically described using several embodiments.

2. Embodiments

2-1. First Embodiment

2-1-1. Configuration

Figure 2:
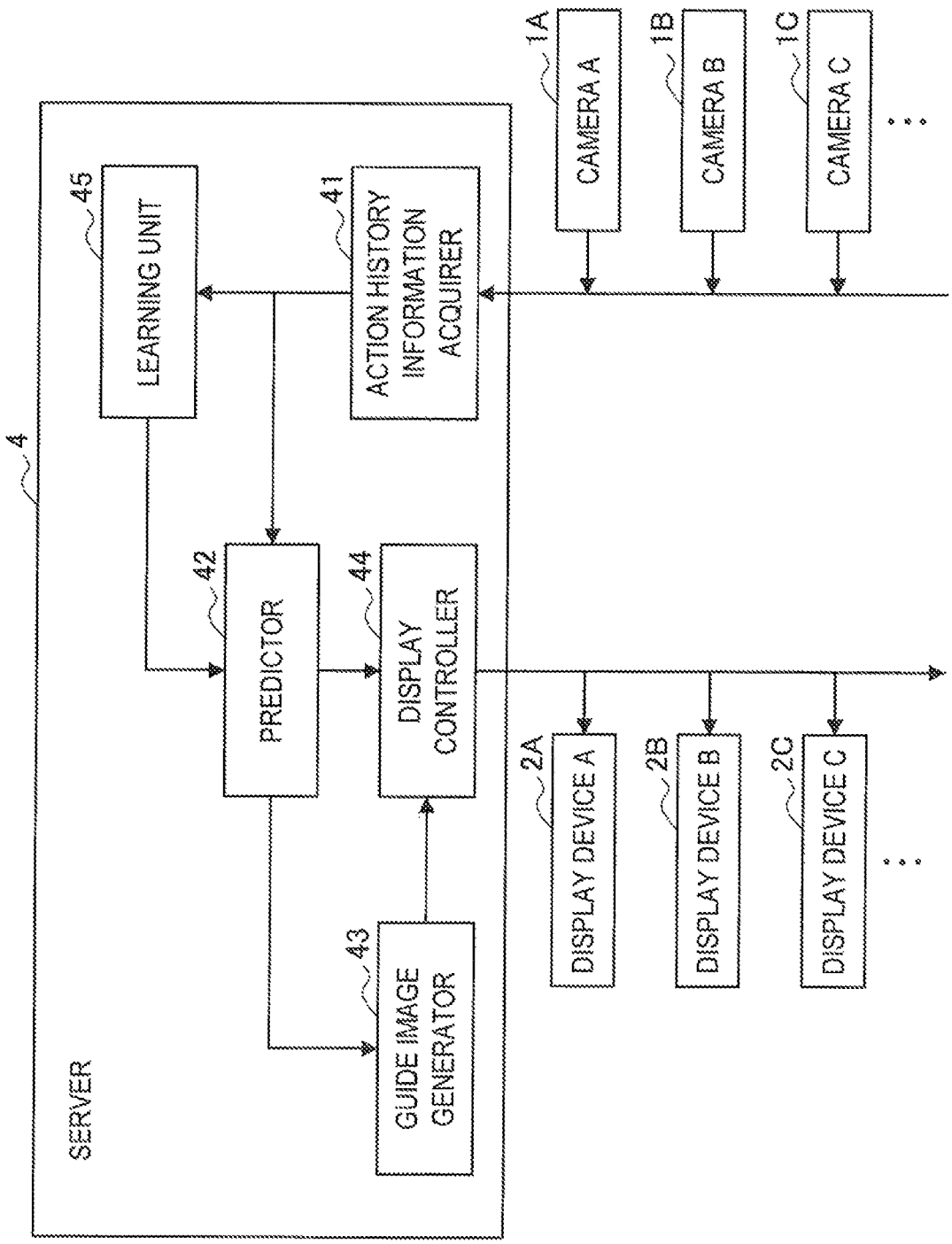
FIG. 2 is a block diagram illustrating a configuration of a display control system according to the first embodiment.

First, a configuration of a display control system according to the first embodiment will be described with reference to FIG. 2. FIG. 2 is a block diagram illustrating a configuration of a display control system according to the first embodiment. As illustrated in FIG. 2, the display control system includes cameras 1A to 1C, display devices 2A to 2C, and a server 4. Note that although a single camera 1 may be included in the display control system, this specification describes the case of including multiple cameras 1 as an example. Hereinafter, each structural element of the display control system will be described in detail.

Camera 1

A camera 1 includes an image sensor, imaging optics that include an imaging lens, and a captured image signal processor. The camera 1 outputs data of a captured image in the form of a digital signal. Note that the image sensor is realized by a charge-coupled device (CCD) imager or a complementary metal-oxide-semiconductor (CMOS) imager, for example. Also, a camera 1 according to the present embodiment captures a subject, and transmits a captured image to the server 4. Note that a camera 1 may also be calibrated in order to estimate device-specific characteristics prior to being installed. Otherwise, an automatic calibration setup used by the manufacturer or the like may also be utilized. Also, a camera 1 may be integrally formed with a display device 2 described next.

Display Device 2

A display device 2 displays image data (still image/moving image) on the basis of control by the server 4. The display device 2 is realized by a projector as illustrated in FIG. 1, for example. Otherwise, a display device 2 may be realized by a liquid crystal display (LCD), organic light-emitting diode (OLED) display, or the like, for example. Also, a display device 2 according to the present embodiment displays a guide image generated by a guide image generator 43 discussed later. Note that a display device 2 may also be calibrated in order to estimate device-specific characteristics prior to being installed.

Server 4

The server 4 predicts a subject's future actions on the basis of a captured image captured by a camera 1, and causes a display device 2 to display a guide image generated according to the prediction result. Also, as illustrated in FIG. 2, the server 4 functions as an action history information acquirer 41, a predictor 42, a guide image generator 43, a display controller 44, and a learning unit 45.

Action History Information Acquirer 41

The action history information acquirer 41 acquires action history information for a subject on the basis of a captured image captured by a camera 1. Action history information refers to information indicating how a subject has acted at what positions, both currently and in the past. A subject's actions indicated by action history information may be, for example, walking or stopping, respective gestures such as raising one's hand, the selection of a path at a corridor intersection, and the like. The action history information acquirer 41 acquires information indicating how a subject acted on the basis of a captured image, and also references memory discussed later to acquire position information indicating the position and height of the camera 1 that captured that captured image, and thereby also acquires information indicating the position at which that action was taken.

At this point, the action history information acquirer 41 may also supplement information indicating past actions with information indicating a current action. For example, the action history information acquirer 41 may also acquire, as action history information, information indicating a subject's action obtained from a current captured image that has been added to information indicating a subject's actions that the action history information acquirer 41 itself obtained in the past. Otherwise, the action history information acquirer 41 may also acquire, as action history information, information indicating a subject's action obtained from a current captured image that has been added to information indicating a subject's actions received externally via a network or the like.

Also, the action history information acquirer 41 is capable of identifying a subject by applying facial recognition to a face depicted in a captured image, and accumulating information indicating a current action, which is added to action history information acquired in the past for the same person. Besides a facial recognition process, the identification of a subject may also be conducted with an identification device such as a radio-frequency identification (RFID) tag carried by the subject.

In addition, the action history information acquirer 41 may also acquire, as one type of action history information, a subject's reaction to a guide image displayed by a display device 2. Specifically, the action history information acquirer 41 may recognize a subject's reaction to a guide image displayed by a display device 2 on the basis of a captured image captured by a camera 1, and acquire action history information on the basis of the recognized reaction.

The action history information acquirer 41 outputs acquired action history information to the predictor 42 and the learning unit 45.

Predictor 42

The predictor 42 predicts a subject's actions according to a captured image captured by a camera 1. More specifically, the predictor 42 predicts a subject's actions on the basis of action history information acquired from captured images by the action history information acquirer 41. Otherwise, the predictor 42 may also predict a subject's actions on the basis of an action pattern that the learning unit 45 discussed later learns from action history information acquired from captured images by the action history information acquirer 41. The predictor 42 outputs a prediction result to the guide image generator 43 and the display controller 44.

Guide Image Generator 43

The guide image generator 43 generates a guide image that guides the subject according to a prediction result from the predictor 42. Specifically, the guide image generator 43 generates a guide image that includes a guide display to a subject's goal indicated by a prediction result from the predictor 42. For example, the guide image generator 43 generates a guide image indicating the respective destinations of intersecting corridors, on the basis of a prediction result indicating that a subject will approach a corridor intersection. Otherwise, the guide image generator 43 generates a guide image that includes a display suggesting actions to a subject according to a prediction result based on an action pattern from the predictor 42. The guide image generator 43 may also generate a guide image according to physical characteristics such as a subject's height, sex, or race. The guide image generator 43 outputs a generated guide image to the display controller 44.

Display Controller 44

The display controller 44 first selects a display device 2 able to display an image at a position corresponding to a subject from among multiple display devices 2, on the basis of a prediction result from the predictor 42. For example, the display controller 44 selects a display device 2 able to display an image on the floor surface of predicted walking route, on the basis of a prediction result that a subject will continue walking. Otherwise, the display controller 44 selects a display device 2 able to display an image on the wall surface at the end of a corridor, on the basis of a prediction result that a subject will continue walking and approach the end of a corridor. At this point, the display controller 44 may also select a display device 2 able to display an image near a subject's position, such as at the subject's feet or on a wall surface in front of the subject, on the basis of a prediction result that the subject will stop walking and stand still. Furthermore, the display controller 44 may also select a display device 2 able to display an image in the direction faced by a subject, on the basis of a prediction result indicating the direction in which the subject is facing. Note that in the case of selecting a display device 2, the display controller 44 may select a display device 2 able to display an image at a position corresponding to a subject by referencing position information indicating the respective installed positions and heights of multiple display devices 2, which is stored in memory discussed later.

Subsequently, the display controller 44 controls the selected display device 2 to display a guide image output from the guide image generator 43 at a position corresponding to a subject. At this point, the display controller 44 may also control the selected display device 2 to display a guide image at a position distanced in proportion to the subject's walking speed. Generally, the faster a person's walking speed, the farther he or she looks ahead, and thus the display controller 44 may control a display device 2 to display a guide image at a position farther away from the subject to the extent that the subject's walking speed is fast, for example. Conversely, the display controller 44 may also control a display device 2 to display a guide image at a position closer to a subject to the extent that the subject's walking speed is slow. Otherwise, the display controller 44 may also control a display device 2 to display a guide image according to physical characteristics such as a subject's height, sex, or race.

Learning Unit 45

The learning unit 45 learns a subject's action pattern on the basis of action history information output from the action history information acquirer 41. The learning unit 45 then outputs a learned action pattern to the predictor 42.

For example, assume that the action history information acquirer 41 acquires, as action history information, a subject with a worried look who is holding a laptop PC in a conference room with a projector, and who finds a cable for connecting the projector and the laptop PC several minutes later. In this case, the learning unit 45 learns an action pattern of "searching for a cable" in the case where a subject is holding a laptop PC in a conference room and has a worried look. As a result, if a camera 1 captures a captured image in which a subject is holding a laptop PC in a conference room and has a worried look, the predictor 42 predicts, on the basis of the learned action pattern, that the subject is searching for a projector cable.

Note that the predictor 42 may also predict a subject's actions on the basis of another person's action pattern in the case where another person's previously learned action pattern similarly applies to the subject.

Supplemental Remarks

The server 4 may also include memory (not illustrated). As discussed above, the memory stores position information indicating the respective installed positions and heights of multiple cameras 1 and multiple display devices 2. The memory also stores map information indicating positional relationships among streets, buildings, addresses, and the like, as well as positional relationships among corridors, rooms, and the like inside respective facilities, which is used in order for the guide image generator 43 to generate a guide image that includes a guide display to a goal.

The above thus describes a configuration of a display control system according to the present embodiment.

2-1-2. Operational Process

Figure 3:
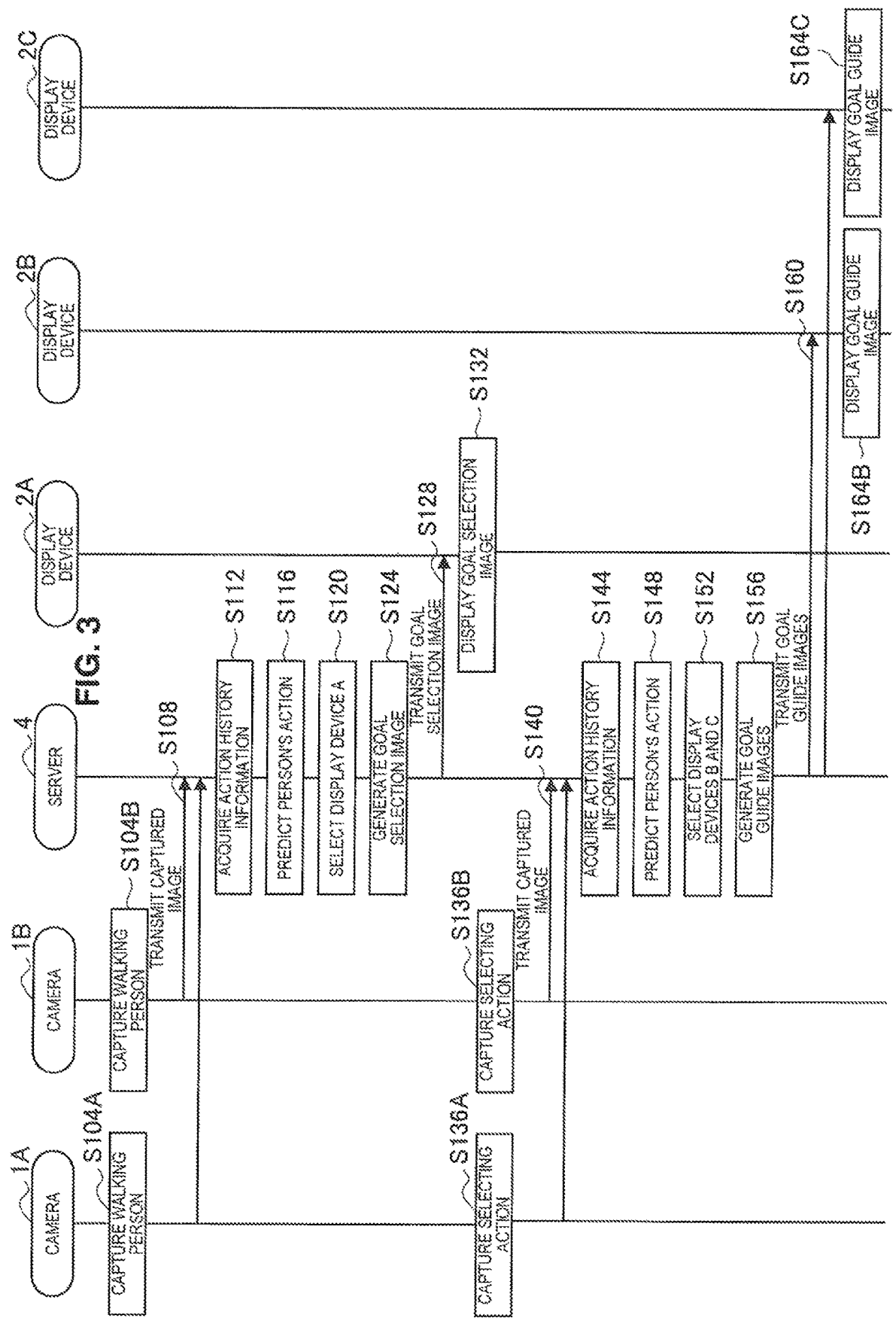
FIG. 3 is a flowchart illustrating operations of a display control system according to the first embodiment.
Figure 4:
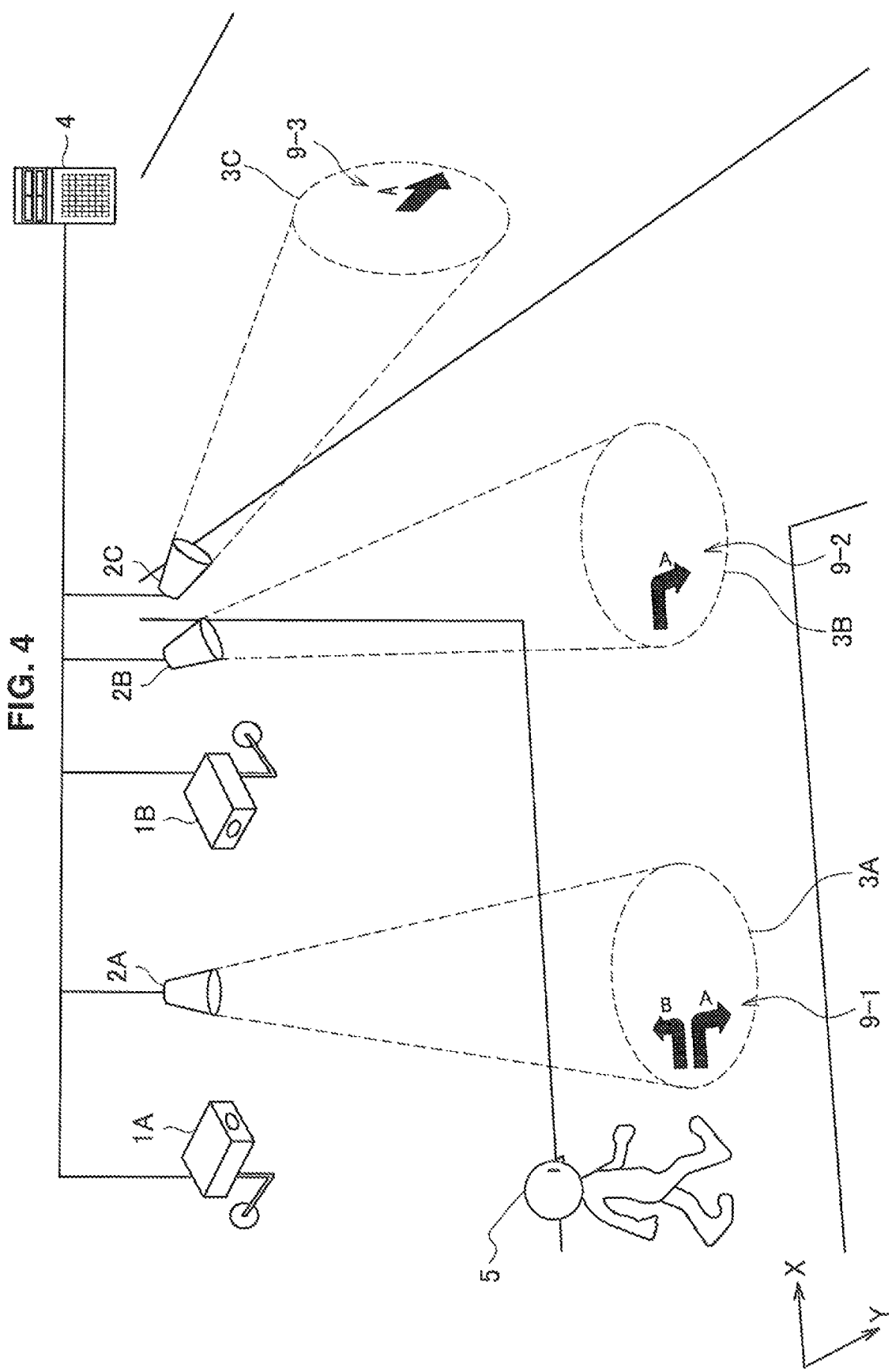
FIG. 4 is an explanatory diagram illustrating an applied example of a display control system according to the first embodiment.

Next, operations of a display control system will be described with reference to FIGS. 3 to 7. FIG. 3 is a flowchart illustrating operations of a display control system according to the first embodiment. FIG. 4 is an explanatory diagram illustrating an applied example of a display control system according to the first embodiment. Hereinafter, operations of the display control system in the applied example illustrated in FIG. 4 will be specifically described, following the flowchart illustrated in FIG. 3.

As illustrated in FIG. 4, cameras 1A and 1B as well as display devices 2A, 2B, and 2C connected to a server 4 are placed along a corridor ending in the X direction at a T intersection, and a subject 5 is walking in the X direction. At this point, as illustrated in FIG. 3, first, in steps S104A and S104B the camera 1A and the camera 1B capture the subject 5 walking in the X direction.

Next, in step S108, the camera 1A and the camera 1B transmit captured images capturing the subject 5 to the server 4.

Subsequently, in step S112, the action history information acquirer 41 acquires action history information from the captured images received from the camera 1A and the camera 1B. More specifically, the action history information acquirer 41 acquires the state of the subject 5 walking in the X direction as action history information.

Subsequently, in step S116, the predictor 42 predicts the actions of the subject 5 on the basis of the action history information acquired by the action history information acquirer 41. More specifically, on the basis of the action history information indicating that the subject 5 is walking in the X direction, the predictor 42 predicts that the subject 5 will continue to walk in the X direction, and reach the T intersection with the corridor in the Y direction illustrated in FIG. 4.

Next, in step S120, on the basis of a prediction result from the predictor 42, the display controller 44 selects the display device 2A, which is able to display an image at a position corresponding to the subject 5. More specifically, on the basis of a prediction result indicating that the subject 5 will continue to walk in the X direction, the display controller 44 selects the display device 2A, which is able to display an image near the position of the subject 5, and also in the X direction in which the subject 5 is facing. For this reason, the display control system is able to display a guide image at a position easily visible to the subject 5. For example, although a comparative example that provides guide displays in every direction surrounding the subject 5 is conceivable, according to a display control system in accordance with the present embodiment, a subject is able to see a desired guide display without looking all around.

Subsequently, in step S124, on the basis of a prediction result from the predictor 42, the guide image generator 43 generates a goal selection image (guide image) that includes a guide display to a goal of the subject 5. More specifically, on the basis of a prediction result indicating that the subject 5 will reach the T intersection, the guide image generator 43 generates a goal selection image that presents the respective destinations in the case of turning right or turning left at the T intersection, and causes the subject 5 to select a goal.

Next, in step S128, the display controller 44 transmits the goal selection image generated by the guide image generator 43 to the selected display device 2A.

Then, in step S132, the display device 2A, under control by the display controller 44, displays the received goal selection image 9-1 on a display surface 3A.

Subsequently, in steps S136A and S136B, the camera 1A and the camera 1B capture the selecting action (reaction) of the subject 5 with respect to the goal selection image 9-1 displayed on the display surface 3A. At this point, assume that the subject 5 selects a goal reached by turning right at the T intersection. Note that the selecting action of the subject 5 at this point, as well as the goal guide image displayed in steps S164A and S164C below, will be later described in detail.

Next, in step S140, the camera 1A and the camera 1B transmit captured images capturing the subject 5 to the server 4.

Subsequently, in step S144, the action history information acquirer 41 acquires action history information from the captured images received from the camera 1A and the camera 1B. More specifically, the action history information acquirer 41 acquires, as action history information, the state of selecting a goal A reached by turning right at the T intersection, which is added to the information indicating that the subject 5 was previously (S104A, S104B) walking in the X direction.

Subsequently, in step S148, the predictor 42 predicts the actions of the subject 5 on the basis of the action history information acquired by the action history information acquirer 41. More specifically, on the basis of action history information indicating that the subject 5 selected a goal reached by turning right at the T intersection, the predictor 42 predicts that the subject 5 will continue walking and turn right at the T intersection.

Next, in step S152, on the basis of a prediction result from the predictor 42, the display controller 44 selects the display devices 2B and 2C, which are able to display images at positions corresponding to the subject 5. More specifically, on the basis of a prediction result indicating that the subject 5 will continue to walk in the X direction, the display controller 44 selects the display devices 2B and 2C, which are able to display images at positions visible to the subject 5 who has moved as a result of walking. In this way, the display control system is able to track the walking behavior of the subject 5 and switch the display devices 2 that display guide images.

Subsequently, in step S156, on the basis of a prediction result from the predictor 42, the guide image generator 43 generates a goal guide image (guide image) that includes a guide display to a goal of the subject 5. More specifically, on the basis of a prediction result indicating that the subject 5 will turn right at the T intersection, the guide image generator 43 generates goal guide images that include a display with instructions to turn right as well as a display of the goal A reached by turning right.

Next, in step S160, the display controller 44 transmits the goal guide images generated by the guide image generator 43 to the selected display devices 2B and 2C.

Then, in step S164B, the display device 2B displays a received goal guide image 9-2 on a display surface 3B. Also, in step S164C, the display device 2C displays a received goal guide image 9-3 on a display surface 3C.

In this way, a display control system is able display a goal guide image on not only a display surface 3B on a floor, but also on a display surface 3C on a wall. For this reason, the subject 5 is able to notice a goal guide image and receive guidance to a goal A, irrespective of whether he or she is looking at the floor or looking ahead.

As described above, the display control system varies the goal guide image to display in step S164, on the basis of a selecting action of the subject 5 with respect to the goal selection image displayed in step S132. As an example, changes in guide images based on selecting actions of the subject 5 according to such a display control system will be described in detail with reference to FIGS. 5 to 7.

Figure 5:
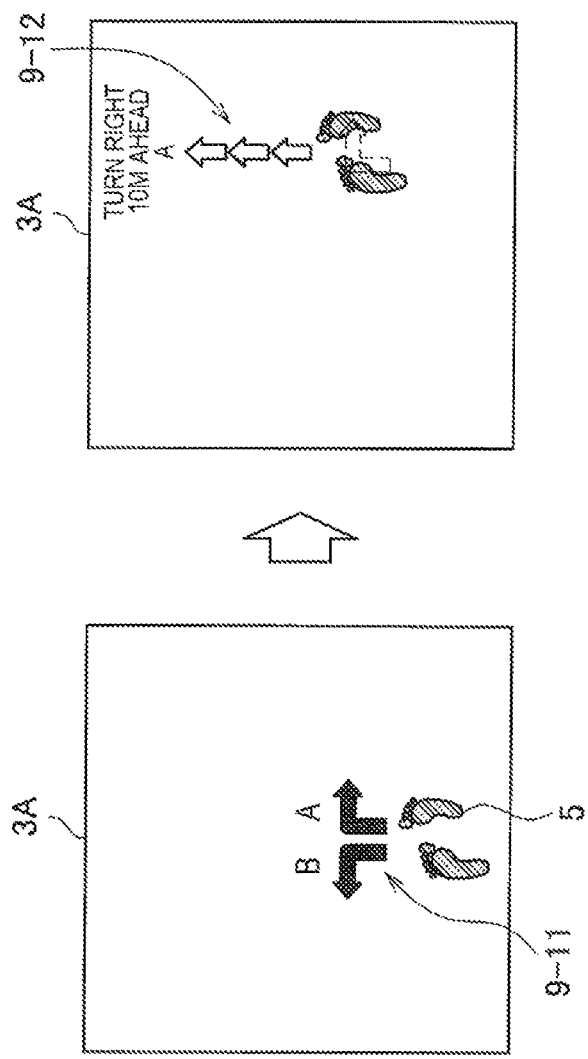
FIG. 5 is an explanatory diagram explaining an example in which a display control system according to the first embodiment updates a guide image according to a subject's reaction.
Figure 6:
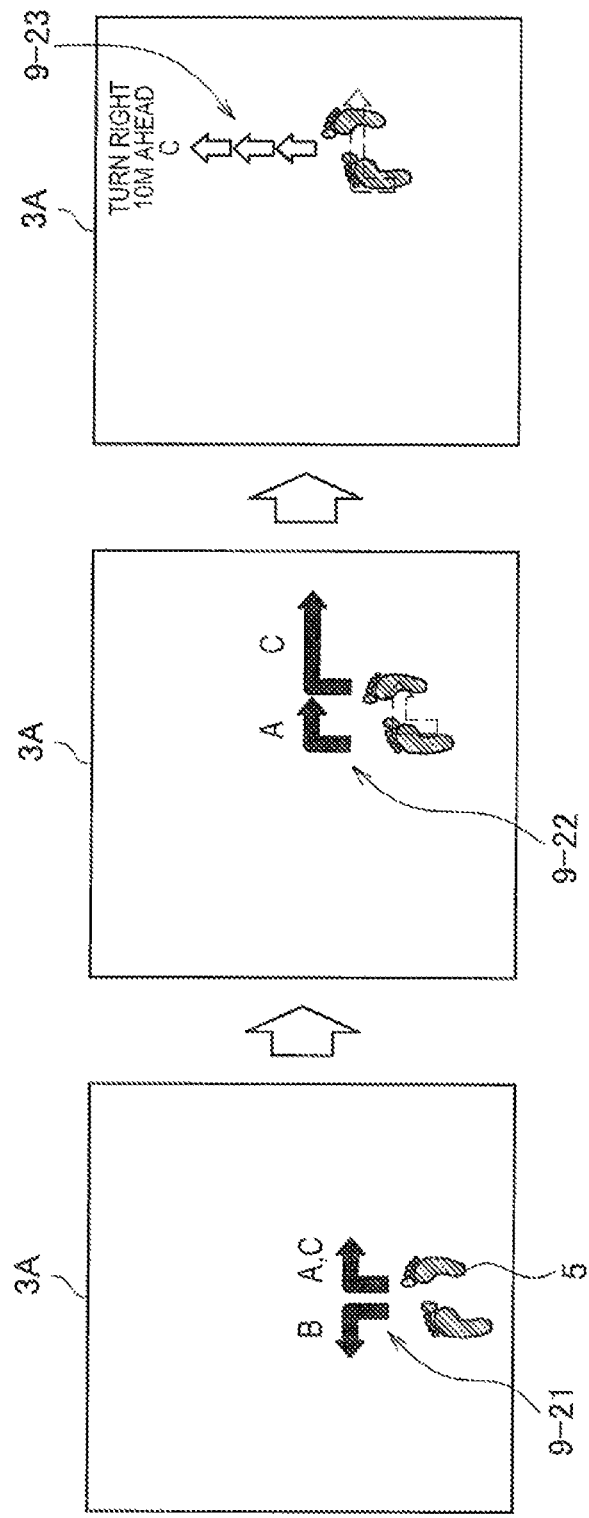
FIG. 6 is an explanatory diagram explaining an example in which a display control system according to the first embodiment updates a guide image according to a subject's reaction.
Figure 7:
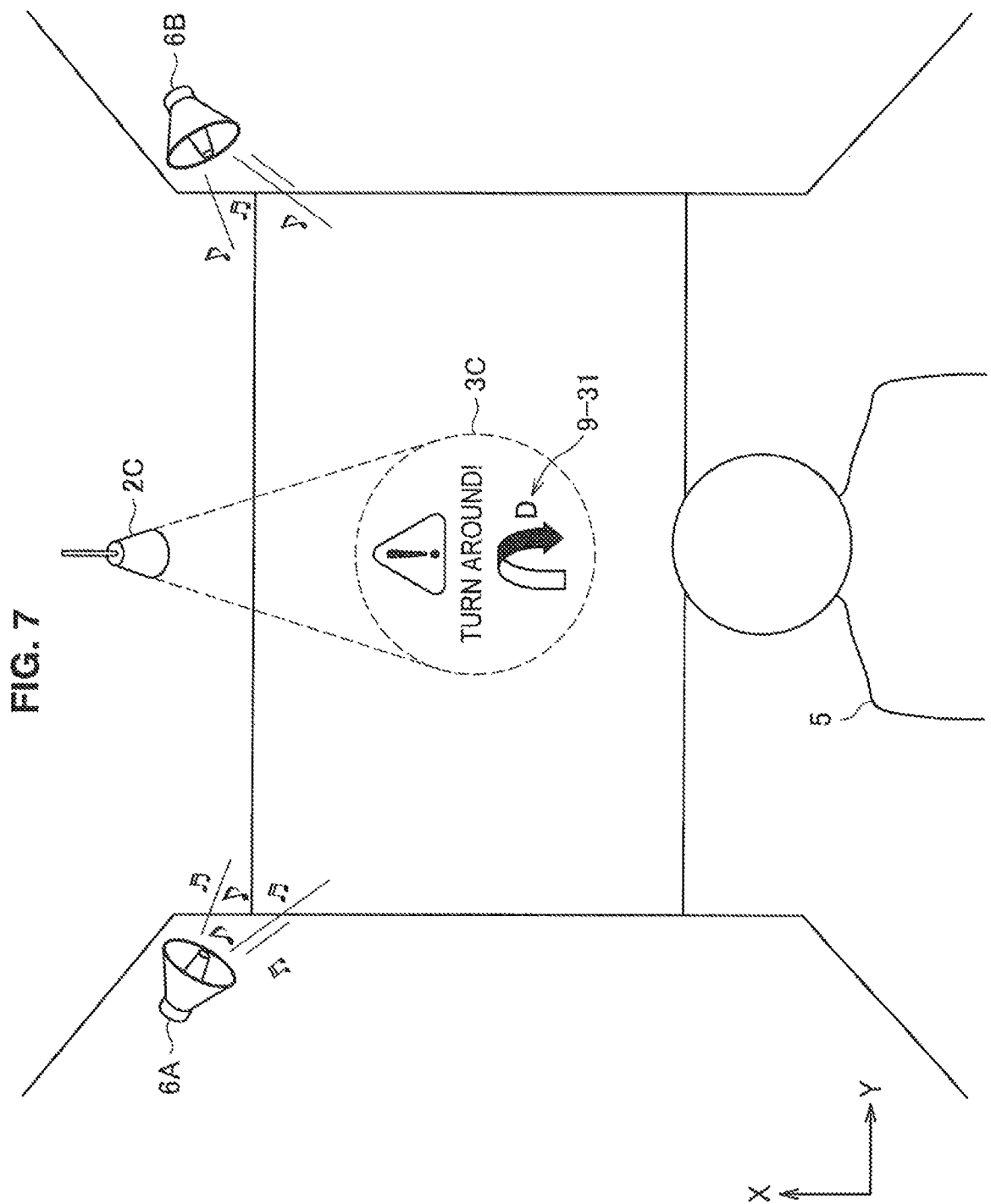
FIG. 7 is an explanatory diagram explaining an example in which a display control system according to the first embodiment updates a guide image according to a subject's reaction.

FIGS. 5 to 7 are explanatory diagrams explaining an example in which a display control system according to the first embodiment updates a guide image according to a subject's reaction.

As illustrated in FIG. 5, there is displayed on the display surface 3A in front of the subject 5 a goal selection image 9-11 that includes a display of a right-turn arrow together with a goal A reached by turning right, as well as a display of a left-turn arrow together with a goal B reached by turning left. At this point, as a selecting action, the subject 5 steps on either the right-turn arrow or the left-turn arrow. For example, if the subject 5 steps on the right-turn arrow, the display on the display surface 3A switches from the goal selection image 9-11 to a goal guide image 9-12, and guide information to the goal A is displayed. In this way, the display control system is able to cause a guide image that includes only information corresponding to the subject 5 to be displayed according to a selecting action of the subject 5, while hiding an irrelevant display. For this reason, the subject 5 is able to receive personalized guidance, and not receive complicated guidance such as a listing of various routes to various goals.

As another example, as illustrated in FIG. 6, there is displayed on the display surface 3A in front of the subject 5 a goal selection image 9-21 that includes a display of a right-turn arrow together with a goal A and a goal C reached by turning right, as well as a display of a left-turn arrow together with a goal B reached by turning left. If the subject 5 steps on the right-turn arrow as a selecting action, the display on the display surface 3A switches from the goal selection image 9-21 to another goal selection image 9-22. The goal selection image 9-22 includes a display of a short right-turn arrow together with goal A that is a short distance away after turning right, as well as a display of a long right-turn arrow together with a goal B that is a long distance away after turning right. At this point, if the subject 5 steps on the long right-turn arrow, the display on the display surface 3A switches from the goal selection image 9-22 to a goal guide image 9-23, and guide information to the goal C is displayed. In this way, the display control system is able to gradually narrow down the goal of the subject 5.

As another example, as illustrated in FIG. 7, the display control system is able to provide a warning display to a subject 5 who is proceeding along a wrong route. For example, in the case where the subject 5 selected a goal D but then proceeded in the opposite direction, the display control system generates a warning image 9-31 to be displayed on the display surface 3C by the display device 2C, as illustrated in FIG. 7. At this point, in order to emphasize the display, the guide image generator 43 may set the font of the warning display to bold, a red color, or the like, and the display controller 44 may also cause the warning image 9-31 to flash. Furthermore, the server 4 may also control a network-connected speaker 6A and speaker 6B to emit a warning sound.

Supplemental Remarks

Besides the above, the method by which a subject 5 selects a goal may include gestures, spoken instructions, informing a receptionist, or the like. The subject 5 makes a gesture or gives spoken instructions as the selecting action with respect to a displayed goal selection image. Also, in the case where the subject 5 informs a receptionist of a goal, the receptionist inputs the goal of the subject 5 into the display control system, by which the display control system displays a goal guide image according to the goal of the subject 5.

Also, in the case where the subject 5 proceeds along a wrong path, although a warning image is displayed and guidance is provided to turn back in the example discussed above, the guide image generator 43 may also newly generate a guide image to the goal, and the display controller 44 may update the display with the newly generated guide image.

Also, in the case of selecting a wrong goal, the subject 5 may cancel his or her own selection with a gesture such as shaking one's head or hand, or by giving spoken instructions, and cause the display control system to once again display a goal selection image. At this point, on the basis of a captured image depicting the cancel instructions from the subject 5, the predictor 42 predicts that the subject 5 will re-select a goal, and the display controller 44 causes a goal selection image newly generated by the guide image generator 43 to be displayed. Also, the method by which the subject 5 cancels his or her own selection and causes a goal selection image to be displayed once again may involve a behavior of disengaging from the guiding indicated by a goal guide image. For example, with the goal guide image 9-12 illustrated in FIG. 5, provided that proceeding straight ahead while stepping on the arrows indicates that the goal is correct, the subject 5 may also cause the display control system to once again display a goal selection image by proceeding without stepping on the arrows.

The above thus describes an operational process of a display control system according to the first embodiment.

2-1-3. Modification 1

Next, a modification of the first embodiment will be described. A display control system according to the present modification generates and displays a guide image according to a subject's physical characteristics. More specifically, first, the guide image generator 43 generates a guide image according to a subject's physical characteristics recognized by a capture result captured by a camera 1. Subsequently, the display controller 44 controls a selected display unit to display a guide image at a position corresponding to the subject's physical characteristics. Hereinafter, operations of a display control system according to the present modification will be described with reference to FIG. 8.

Figure 8:
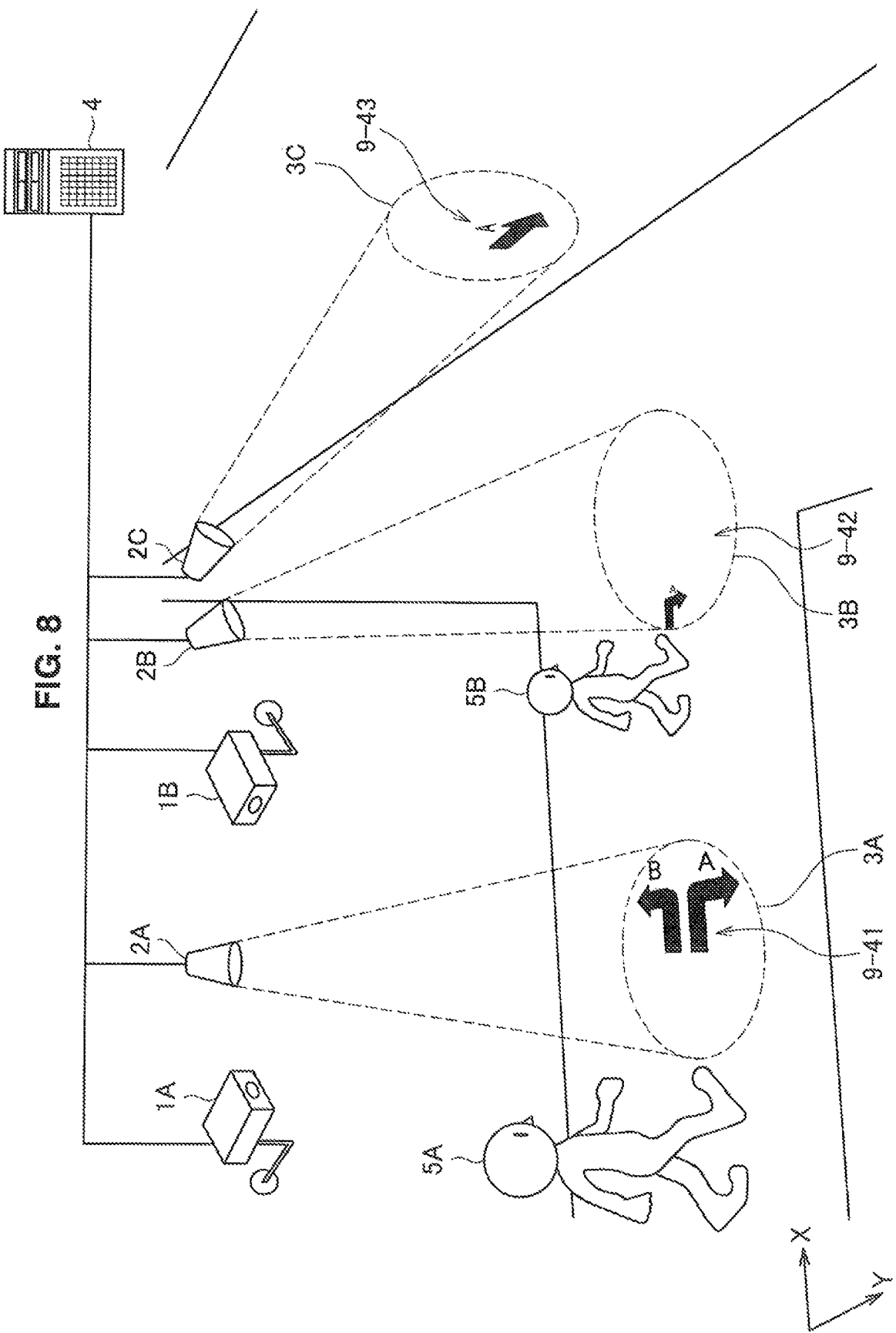
FIG. 8 is an explanatory diagram for explaining operations of a display control system according to Modification 1.

FIG. 8 is an explanatory diagram for explaining operations of a display control system according to Modification 1. As illustrated in FIG. 8, a subject 5A of tall height and a subject 5B of short height are walking along a corridor in the X direction.

Herein, in the case of looking at information displayed on a floor, generally, since a person of tall height has a higher point of view, a larger display is easier to see, whereas the opposite is true for a person of short height. For this reason, the guide image generator 43 may generate a large guide image in proportion to the physical characteristic of height for a subject 5. Specifically, as illustrated in FIG. 8, since the subject 5A is of tall height, the guide image generator 43 generates a goal selection image 9-41 of large size, which is displayed on the display surface 3A by the display device 2A. On the other hand, since the subject 5B is of short height, the guide image generator 43 generates a goal guide image 9-42 of small size, which is displayed on the display surface 3B by the display device 2B.

Furthermore, in the case of looking at information displayed on a floor, generally, since a person of tall height has a higher point of view, information displayed at a position distanced from the place where the person is standing is easier to see, whereas the opposite is true for a person of short height. For this reason, the display controller 44 may also control a selected display unit to display a guide image at a position distanced in proportion to the physical characteristic of height for a subject 5. Specifically, as illustrated in FIG. 8, since the subject 5A is of tall height, the display controller 44 controls the display device 2A to display the goal selection image 9-41 at a position distanced from the subject 5A on the display surface 3A. On the other hand, since the subject 5B is of short height, the display controller 44 controls the display device 2B to display the goal guide image 9-42 at a position close to the subject 5B on the display surface 3B.

Moreover, in the case of looking at information displayed on a wall, generally, since a person of tall height has a higher point of view, a display at a high position is easier to see, whereas the opposite is true for a person of short height. For this reason, the display controller 44 may also control a selected display unit to display a guide image at a higher position in proportion to the physical characteristic of height for a subject 5. Specifically, as illustrated in FIG. 8, the display controller 44 controls the display device 2C to display a goal guide image 9-43 at a low position inside the display surface 3C, to match the position of the point of view of the subject 5B with a short height.

In this way, a display control system according to the present modification is able to display an easily visible guide image at an easily visible position according to a subject's physical characteristics.

Supplemental Remarks

The display controller 44 may also control a display device 2 to display a guide image at a position distanced in proportion to a subject's walking speed. Otherwise, the guide image generator 43 and the display controller 44 may also operate according to externally distinguishable factors, such as a subject's sex, race, or age. For example, a display device 2 may provide a warning display in the case where the predictor 42 predicts that a subject will mistakenly enter a restroom for the opposite sex.

2-1-4. Modification 2

Another modification of the first embodiment will be described. In the case where multiple persons are in the same place, a display control system according to the present modification provides a display such that a guide image for each person is difficult for the other persons to see. More specifically, in the case where another person is present near a subject, the display controller 44 controls a selected display unit to display a guide image for the subject distinguishably from another guide image displayed for the other person. Hereinafter, operations of a display control system according to the present modification will be described with reference to FIG. 9.

Figure 9:
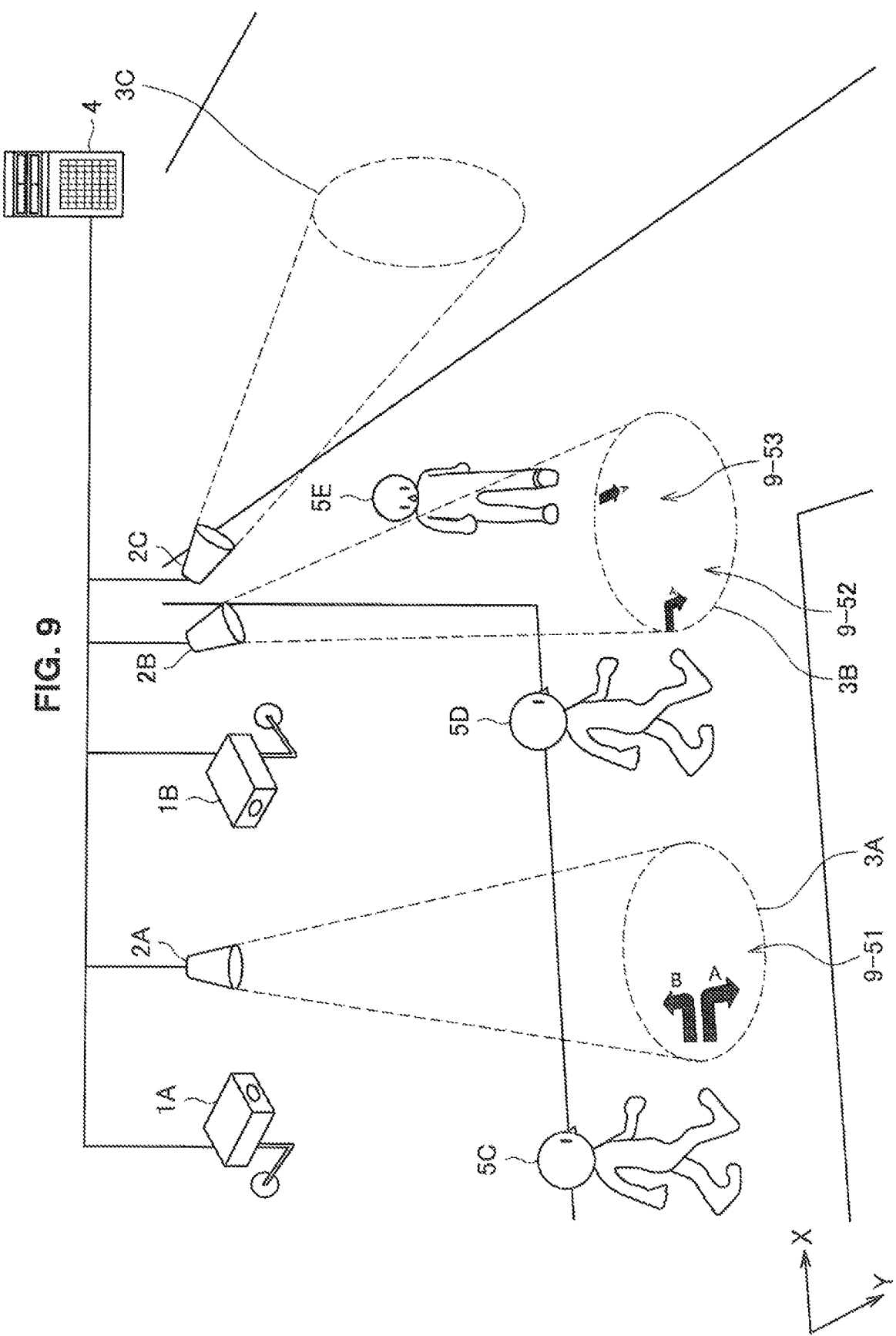
FIG. 9 is an explanatory diagram for explaining operations of a display control system according to Modification 2.

FIG. 9 is an explanatory diagram for explaining operations of a display control system according to Modification 2. As illustrated in FIG. 9, subjects 5C and 5D are walking along a corridor in the X direction, while a subject 5E is walking along a corridor in the Y direction. First, since there is no other person in the vicinity of the subject 5C, the display controller 44 displays a goal selection image 9-51 on the display surface 3A without conducting special processing. On the other hand, since the subjects 5D and 5E are walking to the same point, the display controller 44 distinguishably displays a goal guide image 9-52 for the subject 5D and a goal guide image 9-53 for the subject 5E on the display surface 3B.

More specifically, as illustrated in FIG. 9, the display controller 44 displays the goal guide image 9-52 for the subject 5D at the feet of the subject 5D, and displays the goal guide image 9-53 for the subject 5E at the feet of the subject 5E. Also, as illustrated in FIG. 9, the guide image generator 43 may also generate the goal guide image 9-52 and the goal guide image 9-53 at small sizes so as to not enter into each other's field of view. Also, the display controller 44 may control the display device 2C to not display any guide image on the display surface 3C on the wall where there is a possibility of being seen by multiple persons.

Otherwise, in the case where multiple subjects 5 are walking in a row, for example, the display controller 44 may also display a guide image for a subject 5 walking in the back behind a subject 5 walking in front. Also, the display controller 44 may display a guide image for a subject 5 walking in the back on the back of a subject 5 walking in front.

In this way, in the case where another person is present near a subject, a display control system according to the present modification displays a guide image for the subject distinguishably from another guide image displayed for the other person. Consequently, a subject is able to receive the display of a guide image without being confused with a guide image for another person, even in the case where multiple people are in the same place.

2-1-5. Modification 3

Another modification of the first embodiment will be described. In a display control system according to the present modification, each camera 1 includes a respective configuration of the server 4 in the first embodiment, and conducts bidirectional communication and control. In the present modification, a camera 1 placed at a position closest to a subject is taken to operate as the server 4 in the first embodiment for that subject.

More specifically, a camera 1 compares the distances from other cameras 1, and conducts action history information acquisition, prediction, guide image generation, and guide image display for the subject at the closest distance. At this point, in the case where the subject moves and another camera 1 becomes closest to the subject, the camera 1 that had been operating as the server 4 up to that point transmits acquired action history information for the subject to the other camera 1. Subsequently, the other camera 1 uses received action history information to take over operation as the server 4 for the subject. Note that this assumes that each camera 1 stores position information about cameras 1 and display devices 2 placed nearby at least, and determines which camera 1 will take over on the basis of the position information.

Hereinafter, operations of a display control system according to the present modification in the applied example illustrated in FIG. 4 will be described with reference to FIG. 10.

Figure 10:
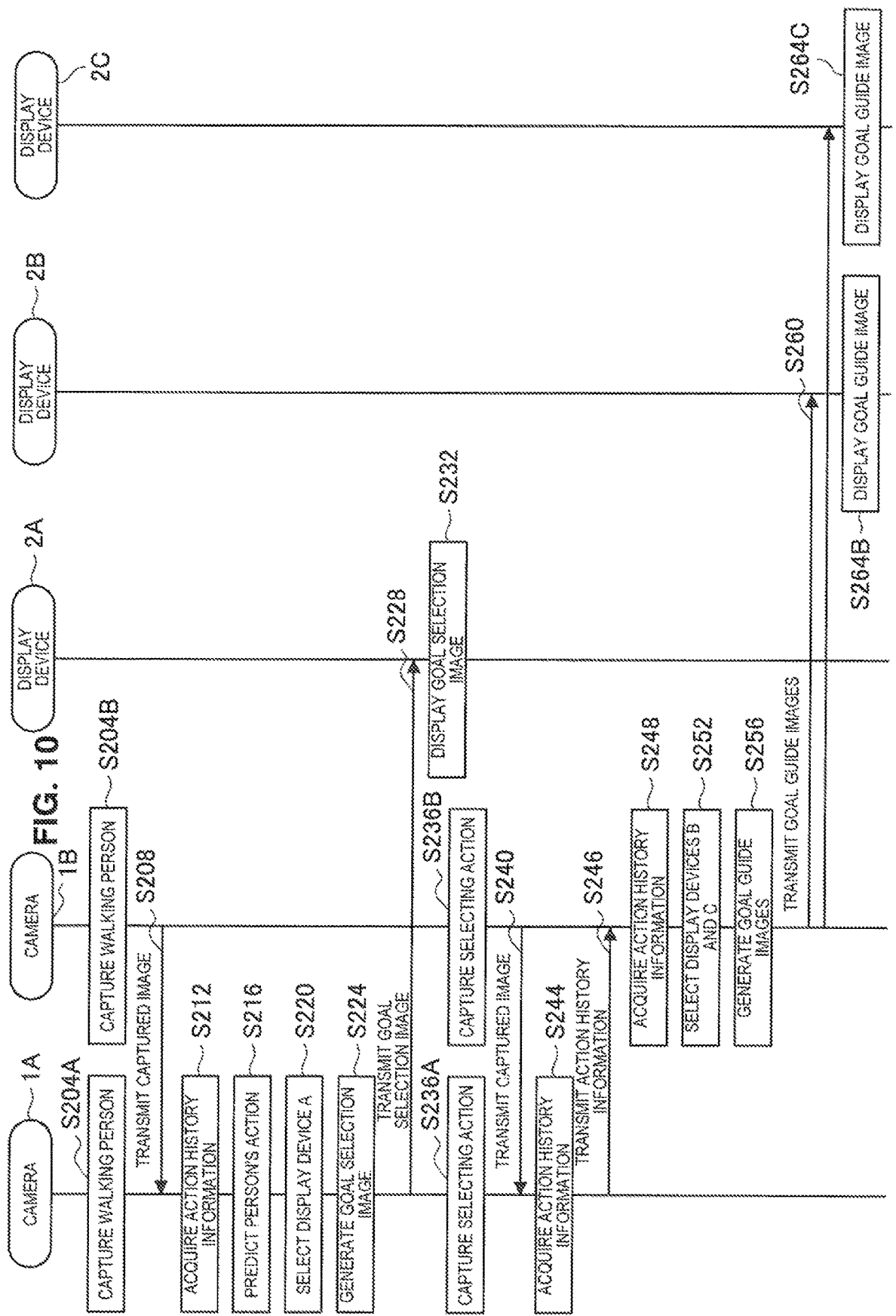
FIG. 10 is a flowchart illustrating operations of a display control system according to Modification 3.

FIG. 10 is a flowchart illustrating operations of a display control system according to Modification 3. First, in steps S204A and S204B, the camera 1A and the camera 1B capture the subject 5 walking in the X direction.

Next, in step S208, the camera 1B transmits a captured image capturing the subject 5 to the camera 1A placed at a position closer to the subject 5.

Subsequently, in step S212, the action history information acquirer 41 included in the camera 1A acquires action history information from the captured image captured by the camera 1A and the captured image received from the camera 1B.

After that, the display control system operates from steps S216 to S236A and S236B similarly to steps S116 to S136A and S136B described with reference to FIG. 3 above.

Subsequently, in step S240, the camera 1B transmits a captured image capturing a subject 5 to the camera 1A.

Next, in step S244, the action history information acquirer 41 included in the camera 1A acquires action history information from a captured image captured by the camera 1A and the captured image received from the camera 1B.

Assume that, since the subject 5 is continuing to walk, the camera 1 closest to the subject 5 at this point changes from the camera 1A to the camera 1B. In this case, functionality as the server 4 is passed over from the camera 1A to the camera 1B as discussed above. For this reason, in step S246, the camera 1A transmits acquired action history information to the camera 1B.

After that, the display control system operates from steps S248 to S264B and S264C similarly to steps S148 to S164A and S164B described with reference to FIG. 3 above.

In this way, a display control system according to the present modification is able to distribute operation as a server 4 among the cameras 1 closest to each subject, without installing a server 4.

The above thus describes modifications in accordance with the first embodiment.

2-2. Second Embodiment

Next, a display control system according to the second embodiment will be described. The present embodiment is a configuration that displays a guide image according to an action pattern learned by the learning unit 45. Since the configuration of a display control system according to the present embodiment is as described in the first embodiment, detailed description will be omitted herein. Hereinafter, operations of a display control system according to the present embodiment will be described with reference to FIGS. 11 to 12.

2-2-1. Operational Process

Figure 11:
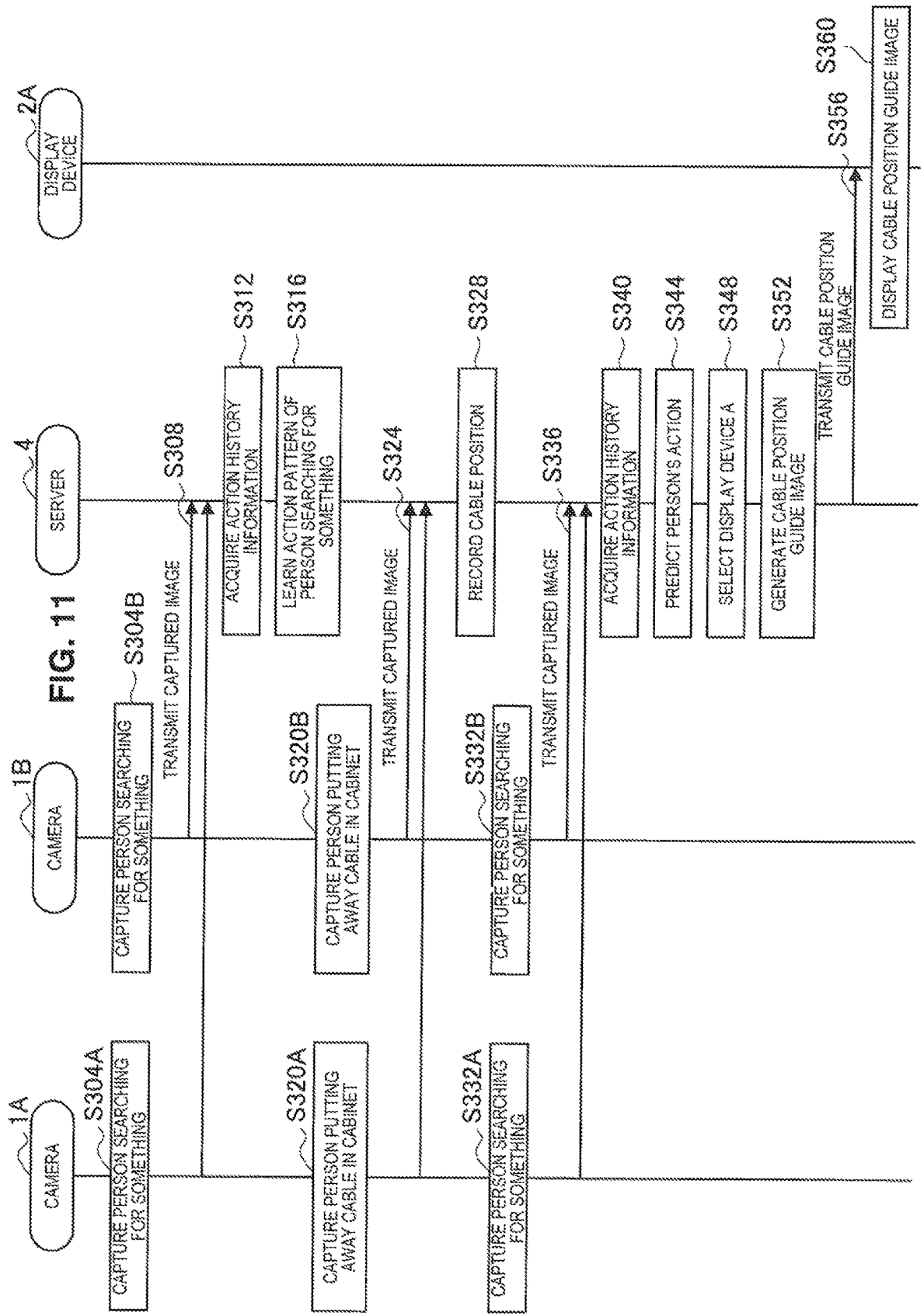
FIG. 11 is a flowchart illustrating operations of a display control system according to the second embodiment.
Figure 12:
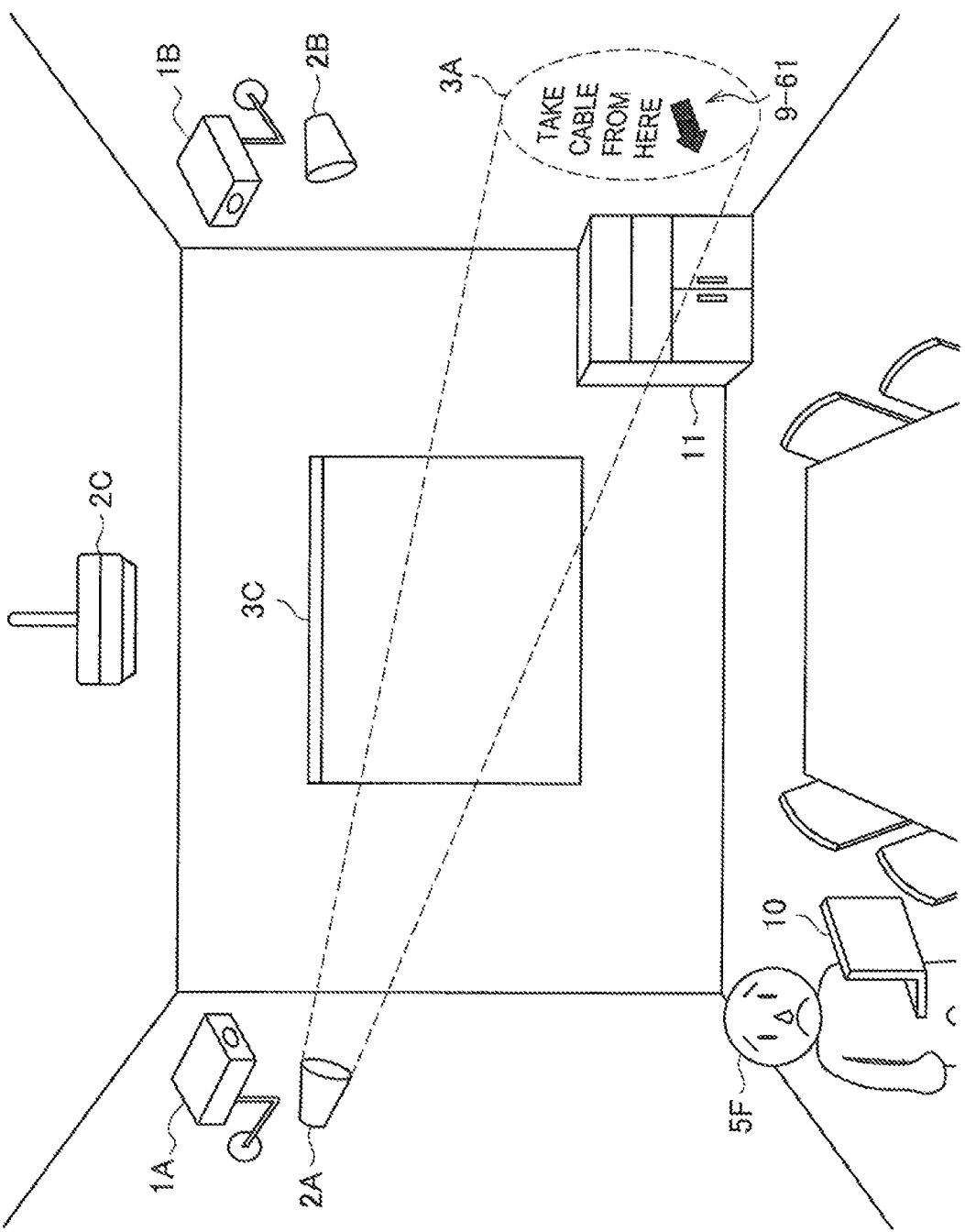
FIG. 12 is an explanatory diagram illustrating an applied example of a display control system according to the second embodiment.

FIG. 11 is a flowchart illustrating operations of a display control system according to the second embodiment. FIG. 12 is an explanatory diagram illustrating an applied example of a display control system according to the second embodiment. Hereinafter, operations of the display control system in the applied example illustrated in FIG. 12 will be specifically described, following the flowchart illustrated in FIG. 11.

As illustrated in FIG. 12, cameras 1A and 1B, display devices 2A, 2B, and 2C, and a cabinet 11 storing equipment are placed in a conference room. First, as illustrated in FIG. 11, in steps S304A and 304B, the camera 1A and the camera 1B capture a subject 5F who is searching for a cable with which to connect a laptop personal computer (PC) 10 to the display device 2C and display an image on a display surface 3C.

Subsequently, in step S308, the camera 1A and the camera 1B transmit captured images to the server 4.

Next, in step S312, the action history information acquirer 41 acquires action history information from the captured images received from the camera 1A and the camera 1B. More specifically, the action history information acquirer 41 acquires, as action history information, the subject 5F holding the laptop PC 10, having a worried look, behaving as though searching for something, and finding a cable.

Subsequently, in step S316, the learning unit 45 learns an action pattern of the subject 5F from the action history information output by the action history information acquirer 41. More specifically, the learning unit 45 learns that the subject 5F is searching for a cable in the case where he or she is holding the laptop PC 10 with a worried look.

After that, in steps S320A and S320B, the camera 1A and the camera 1B capture the subject 5F putting away a used cable in the cabinet 11.

Subsequently, in step S324, the camera 1A and the camera 1B transmit captured images to the server 4.

Then, in step S328, the server 4 remembers that the cable is stored in the cabinet 11, or in other words, that the cable is positioned in the cabinet 11.

On another day, in steps S332A and S332B, the camera 1A and the camera 1B again capturing subject 5F holding a laptop PC 10 with a worried look and searching for a cable.

Subsequently, in step S336, the camera 1A and the camera 1B transmit captured images to the server 4.

Next, in step S340, the action history information acquirer 41 acquires action history information from the captured images received from the camera 1A and the camera 1B. More specifically, the action history information acquirer 41 acquires, as action history information, the subject 5F holding the laptop PC 10 and having a worried look.

Subsequently, in step S344, the predictor 42 predicts the actions of the subject 5F on the basis of an action pattern learned by the learning unit 45. More specifically, the predictor 42 references the action pattern for a subject 5F holding a laptop PC 10 and having a worried look, and predicts that the subject 5F is currently searching for a cable.

Next, in step S348, the display controller 44 selects the display device 2A, which is able to display an image at a position easily visible to the subject 5F. Subsequently, in step S352, the guide image generator 43 generates a guide image that includes a display suggesting actions to a subject according to a prediction result based on an action pattern. More specifically, according to the prediction result that the subject 5F is currently searching for a cable, the guide image generator 43 generates a guide image indicating the cable position to the subject 5F and suggesting cable acquisition.

Next, in step S356, the display controller 44 transmits the guide image to the display device 2A, and in step S360 the display device 2A displays a guide image 9-61 suggesting cable acquisition to the display surface 3A.

Supplemental Remarks

The display control system may also display a guide image based on an action pattern learned for another person to a subject. For example, in the above example, in the case where another subject 5 is holding a laptop PC 10 with a worried look in a conference room, the display control system may likewise take that other subject to be searching for a cable similarly to the subject 5F, and display a guide image suggesting cable acquisition. Otherwise, in the case where multiple people perform the same action in the same place, the display control system may display a guide image suggesting the same action as an action performed by multiple people, even if the subject has never been to that place before.

In this way, a display control system according to the present embodiment is able to display a guide image suggesting an action to a subject, on the basis of a learned action pattern. For this reason, a subject is able to receive a suggestion for an action to perform, without performing some kind of conscious action such as inputting a goal selection or object of search into the display control system.

The above thus describes an operational process of a display control system according to the second embodiment.

2-2-2. Applied Example 1

Next, another applied example of the second embodiment will be described. Hereinafter, operations of a display control system according to an applied example will be described with reference to FIG. 13.

Figure 13:
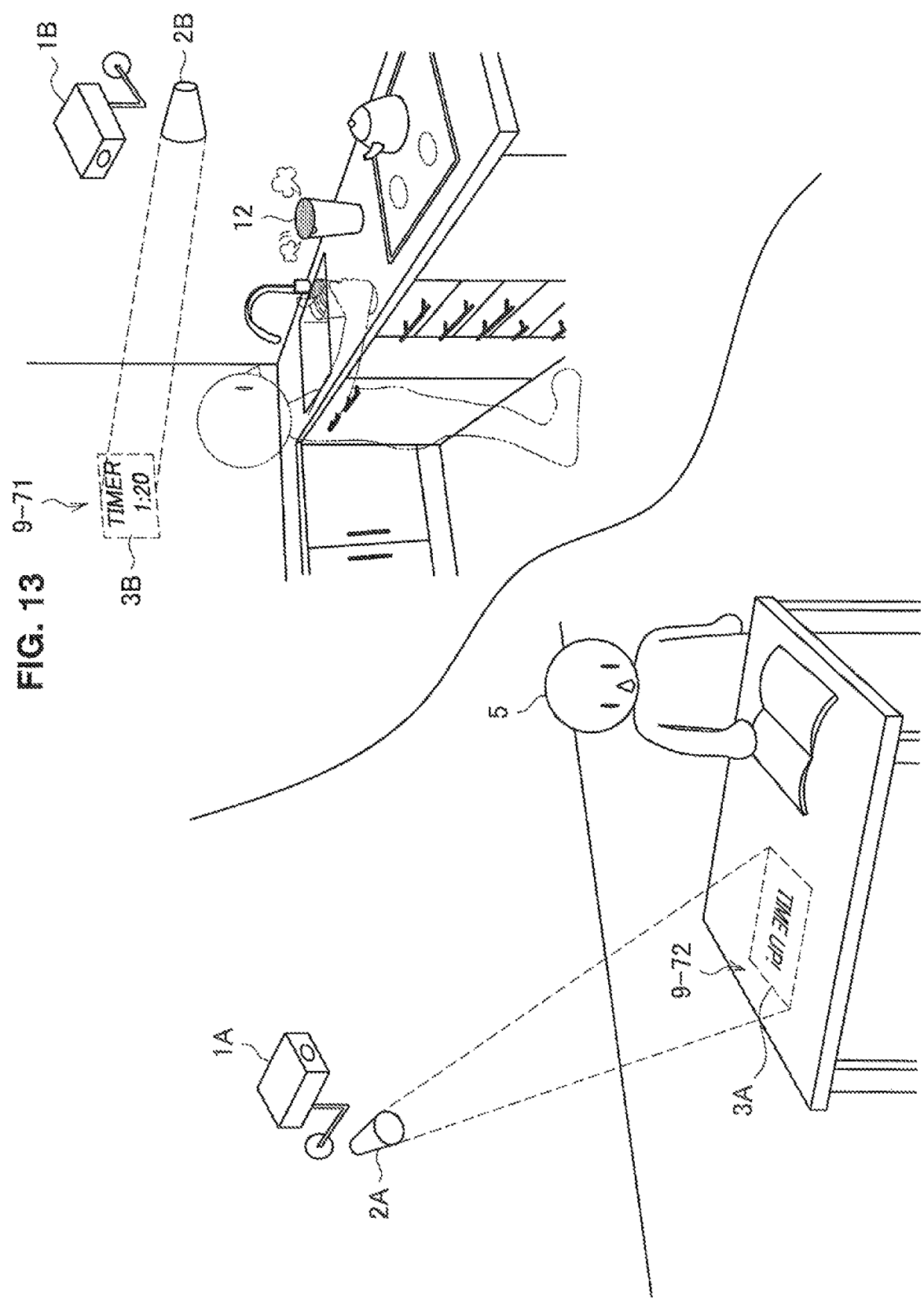
FIG. 13 is an explanatory diagram illustrating an applied example of a display control system according to the second embodiment.

FIG. 13 is an explanatory diagram illustrating an applied example of a display control system according to the second embodiment. As illustrated in FIG. 13, although a subject 5 had poured hot water over instant noodles 12 in a kitchen several minutes earlier, currently he or she is reading in a separate room from the kitchen. The display device 2B is displaying a guide image 9-71 indicating the remaining time until the instant noodles 12 are ready on a display surface 3B, but since the subject 5 is reading, the subject 5 would not notice even if a guide image indicating that the instant noodles 12 are ready were displayed on the display surface 3B.

At this point, assume that the learning unit 45 has already learned an action pattern of the subject 5 pouring hot water over instant noodles 12 and eating in the case where the remaining time reaches zero. On the basis of the action pattern learned by the learning unit 45, the predictor 42 predicts that the subject 5 will eat the instant noodles 12 in the case where the remaining time reaches zero. In this case, the guide image generator 43 generates a guide image indicating that the remaining time has reached zero as a guide image including a display suggesting an action to the subject 5. Then, when the remaining time reaches zero, the display device 2A displays the generated guide image 9-72 on a display surface 3A perceivable by the subject 5 who is reading.

2-2-3. Applied Example 2

In addition, another applied example of the second embodiment will be described. Hereinafter, operations of a display control system according to an applied example will be described with reference to FIG. 14.

Figure 14:
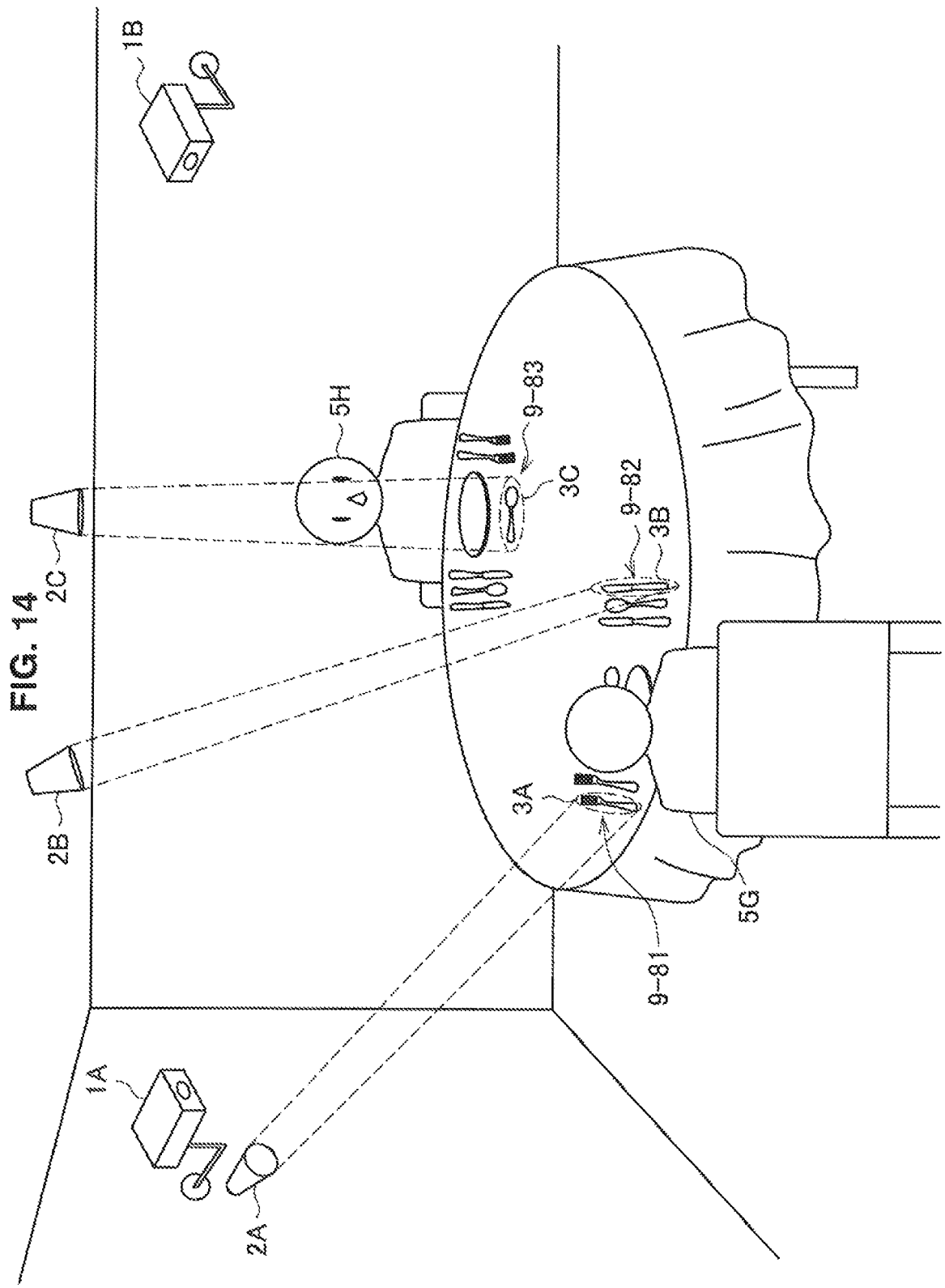
FIG. 14 is an explanatory diagram illustrating an applied example of a display control system according to the second embodiment.

FIG. 14 is an explanatory diagram illustrating an applied example of a display control system according to the second embodiment. As illustrated in FIG. 14, a subject 5G and a subject 5H are dining at the same table in a restaurant, and multiple knives, forks, and spoons are placed on the table as cutlery. Generally, although cutlery is used starting from those placed on the left and right ends, sometimes there are cases in which only the one on the right end is used, or cases in which one placed inward is used. Consequently, in some cases a subject may not know which cutlery to use unless he or she asks an employee.

At this point, assume that the learning unit 45 has previously learned action patterns of dishes brought out in a restaurant and the cutlery corresponding to such dishes. Thus, when dishes are served to the subject 5G and the subject 5H, the guide image generator 43 generates a guide image indicating the cutlery corresponding to each dish as a guide image including a display suggesting an action to the subjects 5G and 5H. The display devices 2 then distinguishably display a guide image for the subject 5G and a guide image for the subject 5H. For example, in the example illustrated in FIG. 14, the display devices 2A and 2B display guide images 9-81 and 9-82 (spotlights) indicating the knife and fork placed on either side of the subject 5G on respective display surfaces 3A and 3B. Also, the display device 2C displays a guide image 9-83 (spotlight) indicating the spoon placed inward to the subject 5H on a display surface 3C.

2-2-4. Other Applied Examples

Otherwise, a display control system according to the present embodiment may also display a guide image suggesting an eating order to a subject. For example, at a buffet-style restaurant, the display control system may also display a guide image suggesting a freshly-cooked dish or the location of a recommended dish. Otherwise, the display control system may also display a guide image to a subject who takes multiple medicines, suggesting the order or interval at which to take the medicines.

Also, a display control system according to the present embodiment may also provide a display of a guide image according to a subject's possessions. For example, in the case where a subject inside a hospital is walking while holding an internal medicine patient card, the predictor 42 predicts that the subject will go to an internal medicine examination room, and the display controller 44 may control a display device 2 to display a goal guide image with an internal medicine examination room set as the goal.

Also, a display control system according to the present embodiment may also be applied to a surveillance system. For example, in the case of capturing a person behaving suspiciously near a private home, that suspicious behavior may fit into a previously learned action pattern for a suspicious person, and thus the predictor 42 may determine that person to be a suspicious person and emit a warning sound. Otherwise, the suspicious behavior may not fit into any previously learned action pattern, and thus the predictor 42 may treat that person's actions as unpredictable, and emit a warning sound. Obviously, a display control system according to the present embodiment may not only emit a warning sound, but also contact a security company, or in some cases, report to the police.

3. Conclusion

As described above, a display control system according to an embodiment of the present disclosure is able to predict a subject's actions, and provide a guide display according to the prediction result. In this case, the display control system is capable of providing a guide display at an easily visible position and range, according to the subject's facing, movement speed, and physical characteristics. Also, even in the case where multiple persons are concentrated in the same place, a display control system is able to provide a guide display to a subject without causing confusion with a guide display for another person.

It should be understood by those skilled in the art that various modifications, combinations, sub-combinations and alterations may occur depending on design requirements and other factors insofar as they are within the scope of the appended claims or the equivalents thereof.

For example, although in the foregoing embodiments a display device 2 is realized by an installed projector or the like, the present technology is not limited to such an example. For example, a display device 2 may also be realized by a head-mounted display (HMD). In this case, the display controller 44 displays a guide image such as a goal selection image or a goal guide image according to information such as the position and facing of a subject wearing an HMD, and the height when worn.

Also, it is possible to create a computer program for causing hardware such as the CPU, ROM, and RAM built into an information processing device to exhibit the same functionality as the respective components of a camera 1, display device 2, and server 4 discussed earlier. Also, a recording medium having such a computer program recorded thereon is also provided.

Additionally, the present technology may also be configured as below.

(1) A display control system including:
a plurality of display units;
an imaging unit configured to capture a subject;
a predictor configured to predict an action of the subject according to a captured image captured by the imaging unit;
a guide image generator configured to generate a guide image that guides the subject according to a prediction result from the predictor; and
a display controller configured to, on the basis of the prediction result from the predictor, select a display unit capable of displaying an image at a position corresponding to the subject from the plurality of display units, and to control the selected display unit to display the guide image at the position corresponding to the subject.

(2) The display control system according to (1), further including:
an action history information acquirer configured to acquire action history information of the subject on the basis of the captured image,
wherein the predictor predicts the action of the subject on the basis of the action history information acquired by the action history information acquirer.

(3) The display control system according to (2), wherein the action history information acquirer recognizes a reaction of the subject to the guide image displayed by the selected display unit on the basis of the captured image, and acquires the action history information on the basis of the recognized reaction.

(4) The display control system according to any one of (1) to (3), wherein
the guide image generator generates the guide image according a physical characteristic of the subject.

(5) The display control system according to any one of (1) to (4), wherein
the display controller controls the selected display unit to display the guide image at a position according to a physical characteristic of the subject.

(6) The display control system according to (4), wherein the guide image generator generates a large guide image in proportion to a physical characteristic of height of the subject.

(7) The display control system according to (5), wherein the display controller controls the selected display unit to display the guide image at a position distanced in proportion to a physical characteristic of height of the subject.

(8) The display control system according to any one of (1) to (7), wherein
the display controller controls the selected display unit to display the guide image at a position distanced in proportion to a movement speed of the subject.

(9) The display control system according to any one of (1) to (8), wherein
the display controller selects, from the plurality of display units, a display unit capable of displaying an image near a position of the subject.

(10) The display control system according to any one of (1) to (9), wherein
the display controller selects, from the plurality of display units, a display unit capable of displaying an image in a direction in which the subject faces.

(11) The display control system according to any one of (1) to (10), wherein
the display controller, in a case in which another person is present near the subject, controls the selected display unit to display the guide image for the subject distinguishably from another guide image displayed for the other person.

(12) The display control system according to any one of (1) to (11), wherein
the guide image includes a guide display to a goal of the subject indicated by the prediction result from the predictor.

(13) The display control system according to (2) or (3), further including:
a learning unit configured to learn an action pattern of the subject from the action history information,
wherein the predictor predicts the action of the subject on the basis of the action pattern learned by the learning unit.

(14) The display control system according to (13), wherein
the guide image includes a display suggesting an action to the subject according to a prediction result based on the action pattern from the predictor.

(15) A non-transitory computer-readable recording medium having a program recorded thereon, the program causing a computer to execute:
capturing a subject;
predicting an action of the subject according to a captured image;
selecting, from a plurality of display units on the basis of a prediction result, a display unit capable of displaying an image at a position corresponding to the subject;
generating a guide image that guides the subject according to the prediction result; and
controlling the selected display unit to display the guide image at the position corresponding to the subject.

The invention claimed is:

1. A system comprising:
a server configured to function as
an action history information acquirer for acquiring information of user motion around a table;
a learning unit for learning one or more patterns of items placed on the table, wherein the one or more patterns comprises a sequence of dishes placed on the table;
a guide image generator for generating one or more images suggesting an action of the user based on the acquired information and at least one of the patterns; and
a display controller for controlling display of the one or more images on the table, wherein the one or more images relate to cutlery associated with the user, and controlling display comprises controlling display based on a position of a person other than the user.

2. The system according to claim 1, wherein the server is further configured to function as a predictor for generating one or more predicted actions of the user according the information of user motion.

3. The system according to claim 2, wherein the guide image generator generates the one or more images based on, at least, one of the predicted actions.

4. The system according to claim 1, wherein the one or more patterns further comprises a pattern of cutlery.

5. The system according to claim 1, further comprising one or more imaging units for generating the information of user motion.

6. The system according to claim 1, further comprising one or more displays for displaying the one or more images on the table.

7. The system according to claim 1, wherein the one or more images indicates cutlery corresponding to a dish on the table.

8. A display control method comprising:
using a server for
controlling acquiring information of user motion around a table;
controlling learning one or more patterns of items placed on the table, wherein the one or more patterns comprises a sequence of dishes placed on the table;
controlling generation of one or more images suggesting an action of the user based on the acquired information and at least one of the patterns; and
controlling displaying the one or more images on the table, wherein the one or more images relate to cutlery associated with the user, and controlling displaying comprises controlling displaying based on a position of a person other than the user.

9. The method according to claim 8, further comprising using the server for controlling generation of one or more predicted actions of the user according to the information of user motion, and wherein controlling generation of one or more images comprises controlling generation of one or more images based on, at least, one of the predicted actions.

10. The method according to according to claim 8, further comprising imaging the user to generate the information of user motion.

11. The method according to claim 8, further comprising displaying the one or more images on the table.

12. A display control method comprising:
using a server for
controlling acquiring information of user motion around a table and previously learned action patterns of a sequence of dishes brought out in a restaurant and cutlery corresponding to such dishes;
controlling generation of one or more guide images based on the information of user motion and at least one of the patterns, the one or more guide images suggesting an action of the user associated with at least one of providing dishes or providing service; and
controlling displaying the one or more guide images on the table, wherein the one or more images relate to cutlery associated with the user, and controlling displaying comprises controlling displaying based on a position of a person other than the user.

13. The method according to claim 12, wherein the step of controlling generation of one or more guide images comprises generating one or more predicted actions of the user according to the information of user motion.

14. The method according to according to claim 12, further comprising imaging the user to generate the information of user motion.

15. The method according to claim 12, further comprising displaying the one or more images on the table.

16. A non-transitory computer-readable medium having stored thereon a computer-readable program for implementing a display control method comprising:
controlling acquiring information of user motion around a table;
controlling learning one or more patterns of items placed on the table, wherein the one or more patterns comprises a sequence of dishes placed on the table;
controlling generation of one or more images suggesting an action of the user based on the acquired information and at least one of the patterns; and
controlling displaying the one or more images on the table, wherein the one or more images relate to cutlery associated with the user, and controlling displaying comprises controlling displaying based on a position of a person other than the user.

17. A non-transitory computer-readable medium having stored thereon a computer-readable program for implementing a display control method comprising:
controlling acquiring information of user motion around a table and previously learned action patterns of a sequence of dishes brought out in a restaurant and cutlery corresponding to such dishes;
controlling generation of one or more guide images based on the information of user motion and at least one of the patterns, the one or more guided images suggesting an action of the user associated with at least one of providing dishes or providing service; and
controlling displaying the one or more guide images on the table, wherein the one or more images relate to cutlery associated with the user, and controlling displaying comprises controlling displaying based on a position of a person other than the user.

* * * * *